United States Patent [19]

Roberge

[11] 4,232,695

[45] Nov. 11, 1980

[54] FLUID CONTROL VALVE AND METHOD

[75] Inventor: Frank L. Roberge, Scottsdale, Ariz.

[73] Assignee: The Garrett Corporation, Los Angeles, Calif.

[21] Appl. No.: 970,714

[22] Filed: Dec. 18, 1978

[51] Int. Cl.² .............................................. F16K 1/44
[52] U.S. Cl. ...................................... 137/1; 251/210; 251/335 B
[58] Field of Search .................... 251/210, 175, 335 B; 137/614.18, 1

[56] References Cited

U.S. PATENT DOCUMENTS

| 969,803 | 9/1910 | Pollock | 137/614.16 |
| 1,370,760 | 3/1921 | Ostrander | 137/614.11 |
| 2,500,156 | 3/1950 | Dechant | 137/614.18 X |
| 2,642,890 | 6/1953 | Skewis | 251/335 B |
| 3,347,262 | 10/1967 | Gibson | 251/65 X |
| 3,908,959 | 9/1975 | Fitchner | 251/65 X |
| 4,166,607 | 9/1979 | Webb | 251/335 B |

FOREIGN PATENT DOCUMENTS 44-4940 of 1963 Japan ............................ 137/614.18

*Primary Examiner*—Arnold Rosenthal
*Attorney, Agent, or Firm*—James W. McFarland; Albert J. Miller

[57] ABSTRACT

A redundantly operating fluid control valve and method particularly suitable for controlling flow of dangerous fluid, utilizing concentric poppets which are sequentially engaged with corresponding seats through movement of a single actuator.

31 Claims, 3 Drawing Figures

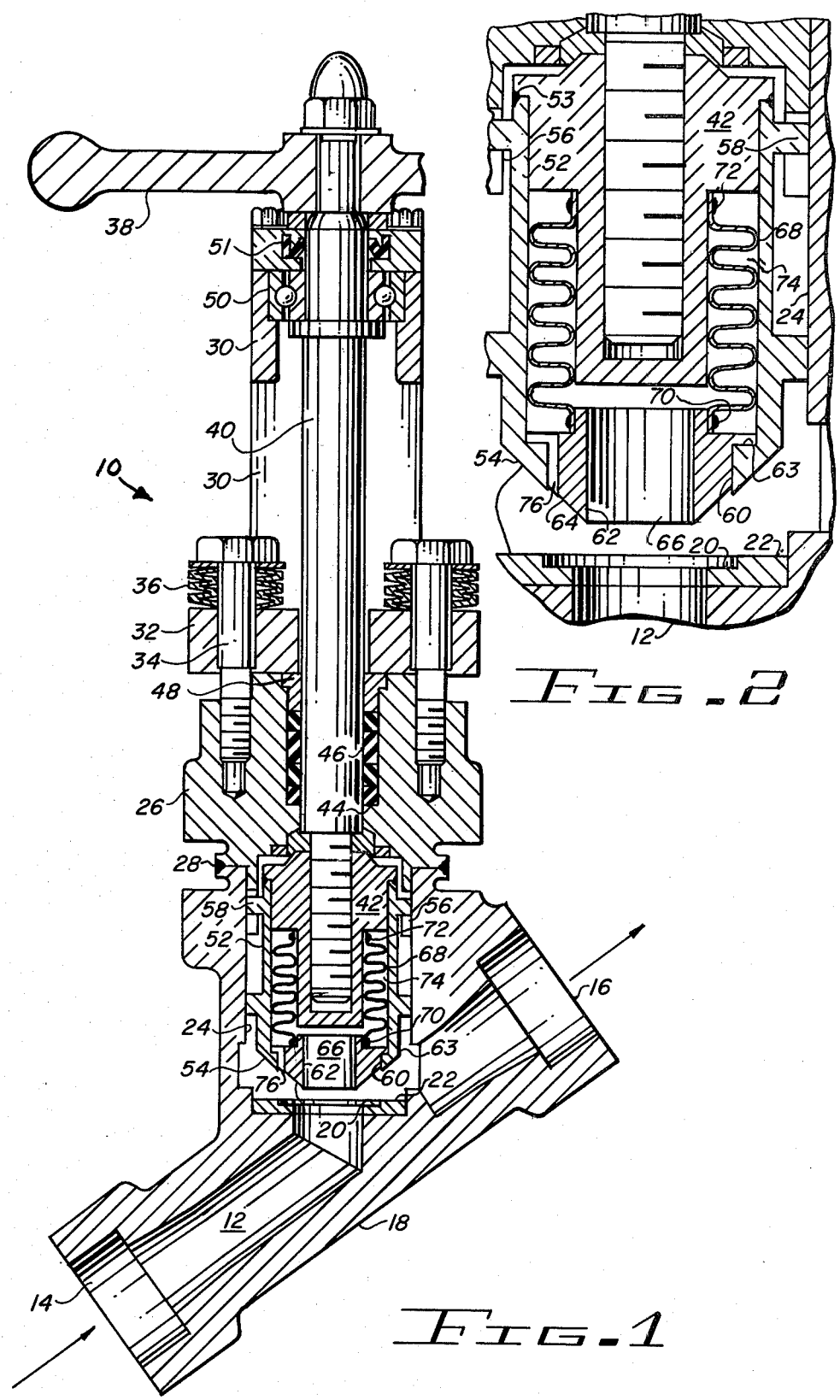

FLUID CONTROL VALVE AND METHOD

BACKGROUND OF THE INVENTION

This invention relates to fluid control valves and methods, and relates more particularly to a redundant type fluid control valve capable of positively sealing the flow of a highly dangerous fluid.

Fluids such as radioactively contaminated liquids demand extremely reliable, fail-safe and long-life control valves. In nuclear power plants for instance, a flow control valve for totally shutting off the flow of a relatively high pressure, high volume flow of radioactively contaminated liquid has such rigid reliability demands. It has heretofore been the practice in such applications to provide a pair of flow shutoff valves in order to produce redundant flow shutoff capability to improve the reliability of the system. However, use of a pair of flow shutoff valves also doubles the number of modes of potential failure.

Another critical factor in the applicability of such valves is the requirement of zero leakage through the valve structure itself. It is apparent that incorporation of a pair of valves for providing redundancy also doubles the potential for such disastrous leakage.

SUMMARY OF THE INVENTION

Accordingly, it is a primary object of the present invention to provide a fluid flow control valve apparatus and method having redundant flow shutoff and control capabilities, yet which provides a minimum number of failure modes and/or potential leakage paths.

Another important object of the present invention is to provide a flow shutoff valve and method having zero leakage.

In summary, the present invention utilizes a pair of circular, concentric poppets which sequentially seat upon associated seats that are arranged upstream and downstream from one another. The present invention utilizes only a single actuator to effect seating of both of the poppets. Through a rigid, yet compressible, impermeable bellows structure which extends between the single actuator and the first poppet to be seated, operation of the actuator seats the first poppet, then compresses the bellows to produce the necessary overtravel in order to seat the second poppet which is disposed downstream of the first poppet. The bellows is arranged such that pressure of the fluid being controlled exerts a biasing force urging the first poppet onto its seat subsequent to the seating thereof. Since the first poppet is always closed prior to seating of the second poppet, this second poppet always seats under low stress conditions reducing tendency to wire draw, and otherwise eliminating possibly deleterious fluid flow action upon this second poppet while seating. This further promotes the high reliability of the valve. The bellows arrangement is configured in order to permit the relative overtravel between the poppets, produce the hydraulic biasing force on one of the poppets, and yet is so arranged such that it is subject to pressure differential substantially under only static loads to promote high reliability of this component also. The present invention also contemplates in use with such an improved dual concentric poppet arrangement, a zero leakage valve structure positively preventing leakage of the dangerous fluid being controlled.

These and other objects and advantages of the present invention are specifically set forth in or will become apparent from the following detailed description of preferred embodiments of the invention when read in conjunction with the accompanying drawings.

BRIEF DESCRIPTION OF THE DRAWINGS

FIG. 1 is an elevational cross-sectional view of a fluid control valve embodying the principles of the present invention;

FIG. 2 is an enlarged view of the dual poppet structure of FIG. 1; and

DETAILED DESCRIPTION OF THE PREFERRED EMBODIMENT

Figure 3:
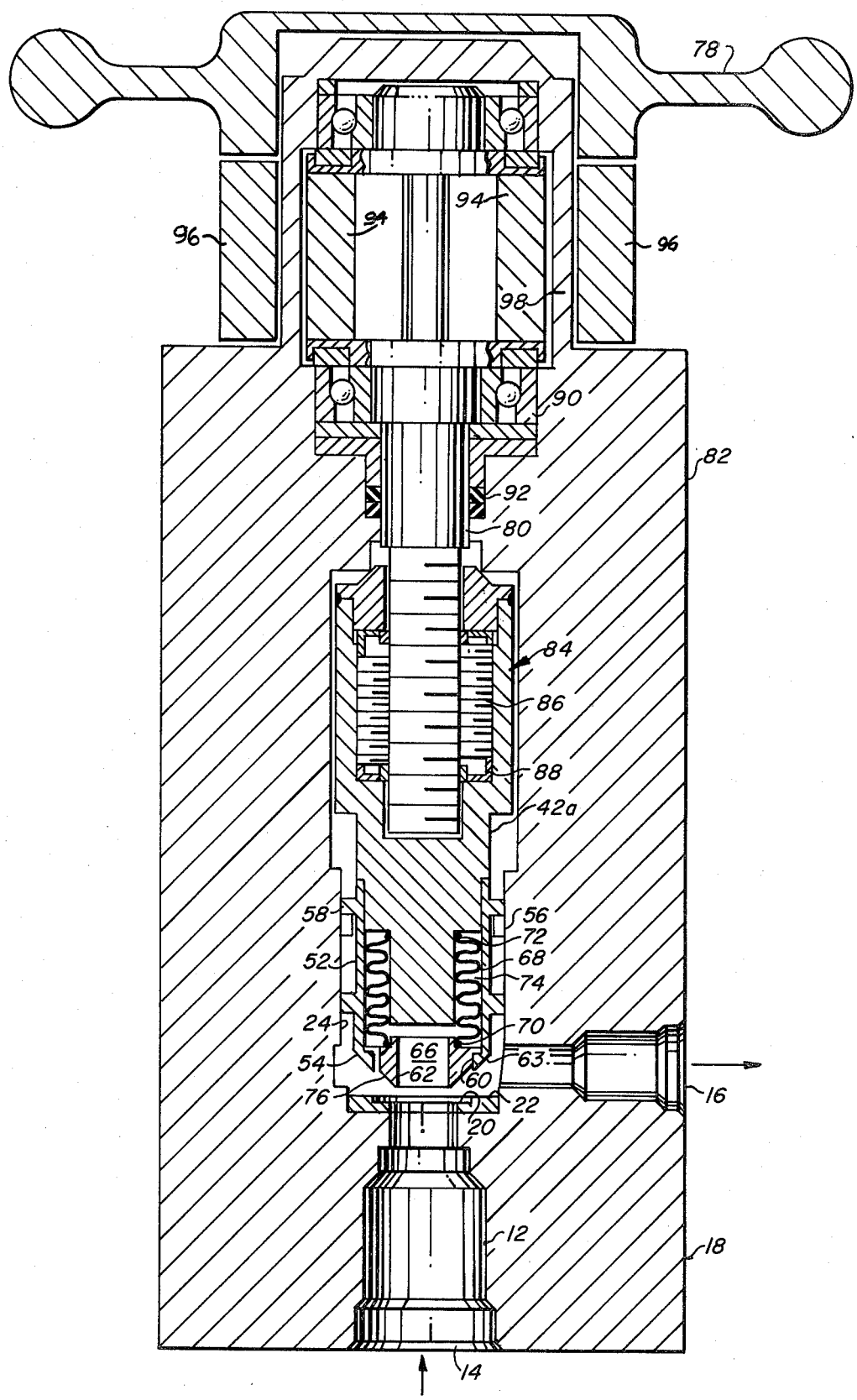
FIG. 3 is an elevational cross-sectional view of another form of the present invention.

Referring now more particularly to the drawings, illustrated in FIGS. 1 and 2 is a flow modulating and shutoff valve generally denoted by the numeral 10 which is associated with the conduit carrying radioactive or other highly dangerous fluid through duct 12 which extends between a high pressure inlet 14 and a fluid exhaust 15. The housing 18 of the conduit further defines a pair of concentric, annular, inner and outer seats 20 and 22 located at a flow interrupting position within the housing. Housing 18 further includes an axially extending bore 24 of varying or stepped diameter.

The valve body further includes a bonnet portion 26 which is secured by weld 28 to body 18, and which also may be further secured thereto by a plurality of bolts not illustrated. Above bonnet 26 is another body portion 30 which has a flange 32 at the lower end thereof with a plurality of headed bolts 34 threadably secured to bonnet 26. A plurality of belleville washers 36 between the heads of the bolts 34 and the flange 32 exert a biasing force downward upon the flange 32. It will be apparent by inspection that the axial bore 24 extends substantially through all portions 30, 32, 26 and 18.

Valve 10 has a single actuating mechanism which includes a manually rotatable handle or hand wheel 38 disposed exteriorly of the valve housing, a stem 40 which extends axially downwardly through the axial bore 24, as well as a member 42 at the lower end of stem 40 which shifts axially in response to rotation of the hand wheel 38 and stem 40. Provided between the stem 40 and member 42 is a transmission or coupling means which transforms the rotation of stem 40 into axial translation of member 42. In the embodiment illustrated in FIG. 1 this coupling is in the form of an Acme screw arrangement between the lower end of stem 40 and member 42.

The central axial bore in bonnet 26 has a stepped diameter to present a lower stop or shoulder surface 44. Sealing means in the form of appropriate packing generally illustrated by the numeral 46 in FIG. 1, which packing may include lantern ring-type sealing members as well as anti-extrusion elements at opposed ends of the packing, is disposed in the larger diameter portion of the axial bore in bonnet 26. A gland 48 extends between the packing 46 and the lower surface of flange 32 such that the spring biasing force exerted by the stacks of belleville washers 36 acts through gland 48 to urge the packing axially downwardly upon shoulder 44 and thus promote excellent sealing between the stem 40 and the bonnet 26 to avoid leakage of fluid flow from the duct 12 through the axial bores of the valve body. At the upper end of the upper body portion 30 are appropriate bearings 50 and other sealing means including an anti-dust elastomeric wiper ring 51.

Disposed within bore 24 is an outer, annular poppet 52 which is secured by a seal weld 53 to the axially translatable member 42. The housing portion 18 is provided with one or more slots 56 on the bore 24 for receiving associated tabs 58 on outer poppet 52 to assure axial translation of the outer poppet 52 and member 42 upon rotation of stem 40. At the lower end of poppet 52 is a valving poppet surface 54 in alignment with and engageable with the outer seat 22 upon axial translation of poppet 52. Poppet 52 has a hollowed interior communicating with duct 12 through a circular central through passage 60 and is axially guided within bore 24. A second, smaller, annular, concentric poppet 62 has a valving surface 64 in alignment with and engageable with the inner seat 20. Poppet 62 also has a central through passage 66 communicating with duct 12 and is axially guided within passage 60 of the outer poppet.

Extending between axially movable member 42 and poppet 62 is a metallic, impermeable, compressible, hollowed, cylindrical bellows 68 having an outer, impermeable, radially corrugated, axially extending, relatively thin cylindrical wall. Opposed ends of bellows 68 are respectively welded at 70 and 72 to the inner poppet 62 and the body 42. The sealing welds 70 and 72 thus define a pressure chamber within the hollowed interior of bellows 68 which communicates with duct 12 only through the central through passage 66 of inner poppet 62. It is important to note that the effective internal diameter of bellows 68 is greater than the diameter of inner seat 20. The space 74 defined between the hollowed interior of outer poppet 52 and the bellows 68 also communicate with duct 12, but through a passage 76 on the outer surface of the inner poppet 62. It will be apparent that through the alignment of poppets 62 and 52 as well as the location of seats 20 and 22, that upon seating of poppet surface 64 on seat 20, the interior of bellows 68 and central through passage 66 communicate with duct 12 at a location upstream of seat 20, while the space 74 on the exterior of bellows 68 communicates with duct 12 at a location downstream of seat 20, more particularly a location intermediate the two seats 20 and 22.

In operation, the valve 10 is illustrated in FIG. 1 in its flow-permitting position with both poppets 62 and 52 spaced from the associated seats 20 and 22 to allow full fluid flow throughout inlet 14 to exhaust 16. Pressure of fluid in duct 12 extends throughout the lower poppet arrangement, being sealed by packing 46. Thus all of the structure below packing 46 is at static pressure. To close the valve, hand wheel 38 is rotated to cause axially downward shifting of member 42. Outer poppet 52 shifts downwardly in direct response thereto, and inner poppet 62 also shifts downwardly directly with the member 42 since bellows 68 is relative rigid and thus capable of transmitting axial downward forces from body 42 to poppet 62. Preferably, poppet 62 has a shoulder 63 resting on poppet 52 in the FIG. 1 position. This allows mechanical pre-load of poppet 62 onto poppet 52 by a pre-load compression of bellows 68.

As hand wheel continues to rotate the surface 64 of poppet 62 first contacts inner poppet 20 to interrupt flow through duct 12. Once the surface 64 is in sealing contact with seat 20, the interior of bellows 68 is communicating with duct 12 through passage 66 at a location upstream of seat 20 and thus the pressure of fluid at inlet 14 exists inside bellows 68. At the same time with sealing contact between surface 64 and seat 20, the pressure downstream of seat 20 and at exhaust 16 drops rapidly. The space 74 exteriorly of bellows 68 communicates with the duct 12 downstream of seat 20 through passage 76. Thus a pressure differential is developed between the interior and exterior of bellows 68. As noted previously bellows 68 is comprised of metallic, impermeable material and the pressure differential between the exterior and interior thereof exerts a hydraulic biasing force urging poppet 62 upon and into sealing, holding engagement with inner seat 20. The hydraulic over-balance creating this downward force as viewed in FIG. 1 is due to the relative arrangement assuring that the effective internal diameter of bellows 68 is larger than the diameter of inner seat 20.

As hand wheel 38 continues to rotate, bellows 68 compresses slightly. This permits overtravel between the two poppets 62 and 52, thereby allowing the sealing surface 54 of poppet 52 to subsequently engage the outer seat 22. Upon engagement with this outer seat, total redundant shutoff flow capability results from the valve structure, yet with utilization of only a single actuator.

Upon and after contact of inner seat 20 with the sealing surface 64, the bellows 68 is subject to a pressure differential. However, through the configuration and arrangement offered by the present invention, the bellows is subject to such pressure differential substantially only as a static load. The only dynamic forces upon bellows 68 while subject to the pressure differential is due to the small amount of compression of the bellows. Preferably the stroke length of this compression is relatively small, for instance between about 1% and 10% of the overall bellows length. In a preferred arrangement of the present invention a stroke length due to compression of approximately 4% of the overall bellows length provides appropriate redundant sealing capability without requiring close tolerances.

It will also be apparent that due to the sequential seating of surfaces 64 and 54, the surface 54 always seats under substantially zero flow and zero pressure differential conditions. This therefore greatly improves the life and reliability of the outer poppet 54 and associated seat 22.

Referring now to FIG. 3, another embodiment of the present invention utilizes substantially the same dual concentric poppet and bellows configuration as illustrated and described in detail above with respect to FIG. 1. The FIG. 3 embodiment incorporates, however, a different actuating mechanism as well as a different sealing arrangement. In this respect the single actuating mechanism in FIG. 3 comprises an outer handle member 78, a rotary stem 80 disposed inside housing 82 of the valve, and a coupling mechanism or transmission for translating the rotation of stem 80 into axial movement at member 42a. In this respect axial movement of member 42a causes the sequential seating of inner poppet 62 upon seat 20, compression of bellows 68, creation of the hydraulic biasing force on bellows 68 further urging the inner poppet 64 upon seat 20, and the subsequent seating of outer poppet 52 upon the outer seat 22, all as described previously with regard to FIG. 1.

The coupling mechanism 84 between stem 80 and member 42a illustrated in FIG. 3 is a type SV Transrol screw manufactured by Latechnique Integrale, Group SKF, Chamberry, France. While an understanding of the operation of coupling mechanism 84 is not necessary for a full and complete understanding of the present invention, it is noted that this Transrol type screw includes a plurality of rollers 86 in threaded engagement with the lower end of stem 80 and with the inner surface of member 42a. The rollers 86 translate axially upon rotation of stem 80 to cause consequent axial movement of member 42a, each such roller 86 being displaced axially by cams 88. Not shown is a slot in the internally threaded surface of member 42a into which each of the rollers 86 are sequentially radially shifted when reaching the slot, and consequently recirculated upwardly towards the top for subsequent operation. As noted, details of operation of the coupling 84 are unnecessary for a full understanding of the present invention, it being noted that the rotation of stem 80 acting through coupling 84 to cause axial shifting of member 42a.

The single actuating mechanism of the valve illustrated in FIG. 3 is of the magnetic coupling type which also presents a completely hermetically sealed steam area. To this end, in addition to necessary bearings 90 as well as packing 92, the valve of FIG. 3 further includes a magnetic coupling in the form of rare earth magnetic material, preferably Samarium Cobalt. Specifically, one section 94 of Samarium Cobalt material is secured to the upper end of stem 80, while another section 96 of the same Samarium Cobalt material is secured to the external actuator 78. Intermediate of the two sections 94, 96 of magnetic material is a metallic cap rigidly secured to or formed as an integral part of the housing 82 which totally surrounds and encapsulates the stem 80 and section 94 of magnetic material. Cap 98 therefore presents a hermetically sealed boundary between the stem 80 and the external actuator 78. The two sections of magnetic material 94, 96 are arranged in circumferential segments with opposed polarity poles so that upon rotation of the external actuator 78 and the associated section 96, the magnetic forces from section 96 act upon the inner section 94 to cause corresponding rotation of stem 80. In this manner it will be seen that rotation of stem 80 and consequent operation of the dual concentric poppet valve can be accomplished, yet while maintaining a completely encapsulating, hermetic seal boundary in the form of the cap 98.

To the extent necessary for the complete understanding of the present invention, reference may be made to co-pending U.S. patent application Ser. No. 899,668 of Alexander Silver entitled "Magnetic Coupling" and Ser. No. 899,669 of Alexander Silver et al entitled "High Speed Magnetic Coupling," each filed Apr. 24, 1978 and having common assignee with the present application and which describe examples of Samarium Cobalt magnetic couplings. The utilization of such rare earth material as the magnetic coupling produces a high torque drive capable of positively seating the pair of dual concentric poppets, yet still maintaining a hermetically sealed boundary totally encapsulating the entire valve to guarantee zero leakage therefrom.

From the foregoing it will also be apparent that the present invention contemplates an improved method of redundantly interrupting pressurized flow of a dangerous fluid within a duct which includes the following steps all of which occur sequentially and automatically in response to continued movement of only a single actuating mechanism: first driving of the inner poppet 62 into fluid sealing engagement with the corresponding seat 20 by way of or through the impermeable compressible bellows 68; then generating a fluid pressure differential across this sealed bellows in order to exert a biasing force further urging the poppet 62 upon seat 20; then compressing the bellows with further movement of single actuator; and subsequently and finally driving the second poppet 52 into fluid sealing engagement with the outer seat 22 which is located downstream of the first seat 20. In this method as well as throughout operation of the invention as set forth previously, it is noted that the bellows 68 does not act as a normal mechanical spring, but rather provides certain compression to produce overtravel permitting the sequential engagement of the respective inner and outer annular poppets 62 and 52. In this respect the method as contemplated by the present invention incorporates a compression stroke length of the bellows which is relatively small, approximately 4% or within the range of 1% to 10% of the overall length of the bellows. The steps of driving the respective poppets is accomplished by axially shifting the actuator and correspondingly axially shifting both poppets and creating axial compression of the bellows. Further, the generation of a fluid pressure differential is created by communicating zones internally and externally of the bellows 68 respectively with the duct 12 at locations upstream and downstream, or in other words upon opposite sides of, the seat 20.

Various modifications to the above-described embodiments will be apparent to those skilled in the art. Accordingly, the foregoing description should be considered as exemplary in nature and not as limiting to the scope and spirit of the invention as set forth in the appended claims.

Having described the invention with sufficient clarity that those skilled in the art may make and use it, I claim:

1. A method of redundantly interrupting pressurized fluid flow through a duct, comprising the following steps occurring sequentially in response to movement of a single actuator:
   driving a first poppet into fluid sealing engagement with a first seat, said first poppet being driven by the actuator through a compressible, impermeable bellows;
   generating a fluid pressure differential on said compressible impermeable bellows urging said first poppet toward said first seat;
   compressing the compressible impermeable bellows; and
   driving a second poppet into fluid sealing engagement with a second seat located downstream of said first seat.

2. A method of redundantly interrupting pressurized fluid flow through a duct, comprising the steps of:
   moving an actuator to drive a first poppet, by way of impermeable compressible bellows, into fluid sealing engagement with a first seat;
   in response to said fluid sealing engagement of said first poppet and seat, generating a fluid pressure differential on said impermeable compressible bellows urging said first poppet toward said first seat; and
   further moving said actuator to compress said impermeable compressible member and subsequently drive a second poppet into fluid sealing engagement with a second seat located downstream of said first seat.

3. A method as set forth in claim 1 or 2, wherein the ratio of compression stroke length to overall length of said bellows is between approximately 0.01 and 0.10.

4. A method as set forth in claim 3, wherein said ratio is about 0.04.

5. A method as set forth in claim 2, wherein said moving and further moving steps include axially shifting said actuator to axially compress said compressible member and axially drive said first and second poppets.

6. A method as set forth in claims 1, 2, or 5, wherein said compressible member has an impermeable outer wall, said generating step including communicating the zones interiorly and exteriorly of said outer wall with said duct at locations on opposite sides of said first seat upon fluid sealing engagment of said first poppet with said first seat.

7. A method as set forth in claim 6, wherein said generating step includes communicating the zones interiorly and exteriorly of said outer wall with said duct at locations respectively upstream and downstream of said first seat.

8. A redundant, zero leakage valve for interrupting flow of a pressurized fluid, comprising:
   a housing having a pressure fluid inlet, an exhaust, a duct extending between the inlet and exhaust, concentric, annular, inner and outer valve seats and an axial bore axially aligned with said seats;
   a single actuating mechanism including a rotatable handle disposed exteriorly of the housing, a stem in said bore of the housing rotatable with said handle, and a member axially shiftable in said bore in response to rotation of said stem;
   sealing means cooperating with said actuating mechanism for preventing leakage of said fluid through said bore;
   a first annularly shaped poppet axially movable toward and away from said inner seat, said first poppet having a central through passage;
   a metallic, impermeable, compressible, hollowed cylindrical bellows having opposed ends sealingly welded to said first poppet and said axially shiftable member, said bellows having an impermeable, radially corrugated, axially extending cylindrical wall with an effective internal diameter greater than the diameter of said inner seat, the hollowed interior of said bellows communicating with said duct only through said central passage of the first poppet; and
   a second annularly shaped poppet concentrically arranged in surrounding relation to said first poppet and axially movable toward and away from said outer seat, said second poppet noncompressibly, rigidly secured to said axially shiftable member, said second poppet having a hollowed interior receiving said compressible bellows,
   said first and second poppets relatively axially arranged to sequentially engage said inner and outer seats in response to axial movement of said axially shiftable member, said central passage of the first poppet and said interior of the second poppet communicating with said duct respectively upstream and downstream of said inner seat upon sealing engagement of said first poppet with said inner seat.

9. A valve as set forth in claim 8, wherein said sealing means comprises packing in said bore in sealing contact with said stem, said packing arranged whereby upon sealing contact between said second poppet and outer seat said packing communicates with said exhaust.

10. A valve as set forth in claim 9, wherein said bore is of stepped diameter presenting a shoulder, said packing disposed in the larger diameter portion of said stepped diameter bore, and further including spring biasing means for exerting a biasing force urging said packing toward said shoulder.

11. A valve as set forth in claim 10, wherein said spring biasing means includes a gland surrounding said stem and engaging said packing, a flange engaging said gland, a plurality of headed bolts threadably securing said flange to said housing, and belleville spring washers stacked between said headed bolts and flange for exerting said biasing force on said gland and said packing.

12. A valve as set forth in claim 8, wherein said sealing means includes rigid cap means hermetically sealed to said housing and cooperating therewith to fully enclose said rotatable stem and provide a hermetically sealed boundary separating said stem and said handle.

13. A valve as set forth in claim 12, wherein said cap is sealingly welded to said housing.

14. A valve as set forth in claim 12, wherein said actuating mechanism further includes a magnetic coupling between said handle and stem for transmitting torque from said handle through said boundary to said stem.

15. A valve as set forth in claim 14, wherein said magnetic coupling comprises first and second adjacent, annular rings of magnetic material respectively affixed to said handle and stem.

16. A valve as set forth in claim 15, wherein said magnetic material is rare earth magnetic material.

17. A valve as set forth in claim 16, wherein said rare earth magnetic material is Samarium Cobalt.

18. A redundant valve for controlling flow of a presurized fluid, comprising:
   a housing having a pressure fluid inlet, an exhaust, a duct extending between the inlet and exhaust, concentric, annular, inner and outer valve seats, and an axial bore aligned with said seats;
   an actuating mechanism axially shiftable in said bore;
   a first annularly shaped poppet axially movable toward and away from said inner seat and having a central through passage;
   a metallic, compressible, hollowed cylindrical bellows having opposed ends sealingly secured to said actuating mechanism and said first poppet, said bellows having an impermeable, radially corrugated, axially extending cylindrical wall with an effective internal diameter greater than the diameter of said inner seat, the hollowed interior of said bellows communicating with said duct only through said central passage of the first poppet; and
   a second annularly shaped poppet concentrically arranged in surrounding relation to said first poppet and axially movable toward and away from said outer seat, said second poppet rigidly secured to said actuating mechanism and having a hollowed interior receiving said compressible bellows,
   said first and second poppets relatively axially arranged to sequentially engage said inner and outer seats in response to axial shifting of said actuating mechanism, said central passage of the first poppet and said interior of the second poppet communicating with said duct respectively upstream and downstream of said inner seat upon sealing engagement of said first poppet with said inner seat.

19. A valve as set forth in claim 18, wherein said actuating mechanism includes a rotatable stem and an axially shiftable member in said bore.

20. A valve as set forth in claim 8 or 19, wherein said actuating mechanism includes a coupling for causing axial shifting of said member in response to rotation of said stem.

21. A valve as set forth in claim 20, wherein said bore includes axial guide slots receiving corresponding radially extending tabs on said member for guiding said member axially in said bore.

22. A flow shut-off valve for interrupting pressurized fluid flow through a duct, comprising:
first and second valve seats serially arranged relative to fluid flow through said duct;
first and second poppets respectively movable into sealing engagement with said first and second valve seats;
a single actuator for moving both said first and second poppets into said sealing engagement, said first poppet rigidly secured to said actuator for corresponding movement therewith; and
a compressible, hollowed bellows intersecuring said second poppet and said actuator to permit limited relative movement between first and second poppets upon compression of said bellows whereby said second and first poppets respectively sequentially engage said second and first seats in response to movement of said actuator, said second poppet and bellows cooperating to define a pressure chamber communicating with pressurized fluid in said duct upstream of said second poppet whereby upon seating of said second poppet on said second seat, pressure in said chamber exerts a force urging said second poppet toward said second seat.

23. A flow shut-off valve comprising:
a housing having an inlet duct communicating with a source of pressurized fluid and exhaust duct communicable with said inlet duct, and first and second concentric seats surrounding said inlet duct at a flow-interruptible location;
movable actuator means extending into said housing;
a first poppet rigidly affixed to said actuator means for movement therewith toward said first seat to sealingly engage said first seats to interrupt flow from said inlet to said exhaust duct;
a second poppet movable toward said second seat for sealing engagement therewith to interrupt flow from said inlet to said exhaust duct;
a compressible element sealingly secured at opposite ends to said actuator means and said second poppet, said element locating said first and second poppets relative to the associated first and second seats whereby movement of said actuator means sequentially causes said second then said first poppet to sealingly contact said second and first seats respectively, said second poppet and said compressible element cooperable with said actuator means to define a chamber in continuous communication with pressurized fluid in said inlet duct upstream of said flow-interruptible location throughout movement of said actuator means, said chamber being closed from said exhaust duct upon sealing contact between said second poppet and seat, said compressible element being configured whereby pressure within said chamber urges said second poppet toward said second seat upon sealing contact therebetween.

24. For use with a housing having a duct for carrying fluid from a high pressure inlet to an exhaust, and concentric, inner and outer circular seats on said housing; a flow control valve comprising:
an actuating mechanism movable axially toward and away from said seats;
an annularly configured, centrally open inner poppet axially shiftable to sealingly engage said inner seat;
a hollowed cylindrical bellows having opposite ends operably sealingly secured to said actuating mechanism and said inner seat to define an internal chamber communicating with said duct only through said centrally open inner poppet, said actuating mechanism operable to shift said inner poppet axially into sealing engagement with said inner seat through said bellows, said bellows arranged whereby upon seating of said inner poppet on said inner seat, said chamber communicates with said high pressure inlet to produce a pressure differential on said bellows exerting a force continuing to urge said inner poppet toward said inner seat; and
an annular outer poppet disposed in concentric relation to said inner poppet, said outer poppet rigidly affixed to said actuating mechanism for axial shifting into sealing engagement with said outer seat, said inner and outer poppets relatively arranged whereby axial movement of the actuating mechanism sequentially seats said inner poppet on said inner seat, then compresses said bellows, and then seats said outer poppet on said outer seat.

25. A valve as set forth in claim 24, wherein said outer poppet has a central through bore opening into a central chamber, said bellows disposed in said central chamber of the outer poppet, said inner poppet having an outer diameter fitting closely within said central through bore of the outer poppet to be axially guided thereby.

26. A valve as set forth in claim 25, further including passage means extending between said central chamber and said duct at a location downstream of said inner seat.

27. A valve as set forth in claim 26, wherein said passage means comprises a passage extending axially through said inner poppet to communicate with said central chamber and said duct at a location intermediate said inner and outer seats.

28. In apparatus including a housing having a pressure fluid inlet, a fluid exhaust, a duct extending between said inlet and exhaust, and concentric inner and outer seats surrounding a portion of said duct; a flow shut-off valve comprising:
a single actuating mechanism;
a first poppet rigidly secured to said actuating mechanism for movement therewith toward engagement with one of said inner and outer seats to interrupt fluid flow from said inlet to said exhaust;
a second poppet engageable with the other of said inner and outer seats to interrupt fluid flow from said inlet to said outlet; and
a metallic, impermeable, cylindrical bellows having opposite ends rigidly, sealingly, operably secured to said actuating mechanism and said second poppet, said bellows arranged whereby movement of said actuating mechanism sequentially seats said second poppet on said other of the seats, compresses said bellows, and subsequently seats said first poppet one said one of the seats, said bellows further arranged and configured whereby upon said seating of the second poppet, pressure of fluid from said inlet acts on said bellows to continuously urge said second poppet toward said other of the seats.

29. In a valve as set forth in claims 18, 22, 23 or 28, wherein the compression stroke length is between about 1% and 10% of the length of said bellows.

30. In a valve as set forth in claim 29, wherein said compression stroke length is about 4% of the length of said bellows.

31. A flow shut-off valve, comprising:
a housing having a pressure fluid inlet, an exhaust, a duct extending between said inlet and exhaust, and a valve seat surrounding said duct at a flow-interruptible location;
an annular poppet having a central through bore, said poppet movable into fluid sealing engagement with said valve seat;
a movable actuator; and
a metallic, compressible bellows having a hollowed interior, a cylindrical impermeable wall, and opposed ends sealingly secured to said actuator and said poppet, said bellows being sufficiently rigid to drive said poppet onto said seat upon movement of said actuator and yet compressing upon further movement of said actuator after said poppet engages said seat, said bellows and poppet cooperable to define a pressure chamber within said bellows communicating only with said duct upstream of said seat through said central bore upon sealing engagement of said poppet and seat, said bellows configured whereby pressure in said chamber urges said poppet toward said seat upon said sealing engagement therebetween.

* * * * *